United States Patent Office

2,843,471
Patented July 15, 1958

---

2,843,471

HERBICIDAL COMPOSITIONS OF CONTROLLED WATER SOLUBILITY

Elias Fischer, Chicago, Ill., assignor to Armour and Company, Chicago, Ill., a corporation of Illinois No Drawing. Application July 23, 1953
Serial No. 369,950

22 Claims. (Cl. 71—2.6)

This invention relates to a new and novel herbicidal composition. In one of its aspects this invention relates to a novel herbicidal composition having predetermined water solubility and which is unaffected by the mineral content normally found in natural waters.

The use of the so-called plant hormones as herbicidal agents has gained widespread acceptance in agriculture in the past few years. Of these plant hormones, two which have gained acclaim for their ability to destroy undesirable plants are 2,4-dichlorophenoxyacetic acid and 2,4,5-trichlorophenoxyacetic acid, or, as these compounds are commonly called, 2,4-D and 2,4,5-T respectively. It has been theorized that these plant horomone carboxylic acids act upon undesirable weed plants by stimulating plant growth to such an excessive degree that death of the plant ultimately results.

One of the major problems encountered in the use of 2,4-D and 2,4,5-T and the plant hormone herbicides in general, is that of their solubility in an aqueous medium when used in a spray or the like. Depending upon the purpose for which the herbicide is to be used, this problem becomes two-fold, namely, in some instances it is desirable to retain the plant hormone in a substantially insoluble state, when dispersed in an aqueous medium, thereby obtaining slow absorption into the plant tissue, while on the other hand, it is often desired that the plant hormone be completely soluble in an aqueous medium so as to effect rapid absorption into undesirable plant tissue when sprayed thereon. Accordingly, prior workers in the field have attempted to solve the problem of solubility variations by one or more of several methods. When the insoluble phases of the plant hormone have been desired, previous workers have relied on inert carriers and the like, or substantially insoluble salts of the plant hormone. See, for example, the co-pending application of H. J. Harwood, R. J. Brault, and R. A. Reck, Serial No. 194,184, filed November 4, 1950.

Where previous workers have attempted to enhance the solubility of the plant hormone their efforts have been directed toward incorporating the hormone or a derivative thereof in a highly soluble carrier. Indeed, in many instances surface active agents have been added to the hormone vehicle to enhance solubility and rate of absorption.

I have found that it is possible to solve this entire problem of water solubility by means of a new and unique type of amine salt of a plant hormone carboxylic acid. By this invention one merely needs to vary the characteristics of the amine member of the salt in order to attain any desired degree of dissolution of the salt throughout the entire spectrum of the plant hormone's solubility. Examples of plant hormones which can be reacted with the amine include, besides 2,4-dichlorophenoxyacetic acid and 2,4,5-trichlorophenoxyacetic acid, auxin, β-indolylacetic acid, α-naphthaleneacetic acid, indolylbutyric acid, indolylpropionic acid, phenylacetic acid and fluorineacetic acid.

The unique property of the flexible solubility of these novel herbicidal compositions lies in the structure of the amine component. The amine employed in this invention is one wherein one straight-chain aliphatic group and two hydroxyethyl or hydroxyethylpolyoxyethyl groups are substituted on the nitrogen. A general formula for such a compound is as follows:

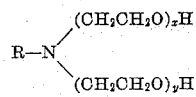

wherein R is a radical selected from the group consisting of straight-chain aliphatic radicals having 8 to 22 carbon atoms and organic radicals derived from wood rosin and tall oil, and wherein $x$ and $y$ are integers the sum of which is from 2 to 50. The straight-chain aliphatic radicals can be saturated or unsaturated, examples of which include lauryl, stearyl, oleoyl, etc., and mixtures of aliphatic radicals are derived from soybean oil, tallow and coconut oil. The organic radicals derived from wood rosin and tall oil include principally the abietyl radical. These amines can be generally classified as cationic surface-active agents.

Theoretically, the straight-chain aliphatic group of the amine molecule is considered a fat-soluble or hydrophobic component. Conversely, the hydroxyethyl or hydroxyethylpolyoxyethyl groups are considered the water-soluble or hydrophilic components. The solubility of such a compound in water exists in a direct ratio between the amount of hydrophobic constituent present as versus the hydrophilic component. Accordingly, as one increases the mass of hydrophobic component present and/or decreases the hydrophilic portion, the water solubility of the substance decreases. Conversely, as the mass of the hydrophobic component decreases and/or the hydrophilic component increases, the water solubility also increases. More simply, it can be stated that the water solubility is generally proportional to the ratio of the length of the carbon atom chain of the aliphatic radical as compared to the chain length or lengths of the hydroxyethylpolyoxyethyl groups.

In general, the method for producing my novel herbicidal compositions comprises the steps of reacting one equivalent of the amine with one equivalent of the plant hormone carboxylic acid at slightly elevated temperatures. The solution is agitated slightly until the reaction is complete.

As can be readily seen the theoretical number of possible types of amines of the general formula

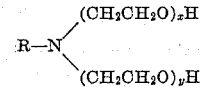

which may be used to effect varying degrees of solubility when reacted with a plant hormone carboxylic acid are, indeed, large. The following examples will aid in demonstrating the flexibility of water solubility attained by the herbicidal compositions of this invention.

*Example I*

One equivalent (305 grams) of an amine of the general formula

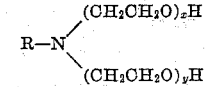

wherein R was a hydrocarbon chain of 12 carbon atoms and the sum of $x$ and $y$ was 2, was heated to from about 110° to 120° C. One equivalent (221 grams) of 2,4-dichlorophenoxyacetic acid was slowly added with stirring. Agitation was continued until the acid was completely dissolved. The salt formed by the reaction was of a soft-gel-like nature. It was slightly dispersible but not soluble in water. This salt displayed good herbicidal properties when tested against undesirable plants.

Example II

One equivalent (369 grams) of an amine of the general formula

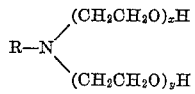

wherein R was a hydrocarbon chain of 18 carbon atoms and the sum of $x$ and $y$ was 2, was reacted with one equivalent (221 grams) of 2,4-dichlorophenoxyacetic acid following the same procedure as employed in Example I. The resulting salt was slightly dispersible, but not soluble in water, and displayed good herbicidal properties.

Example III

One equivalent (2,476 grams) of an amine of the general formula

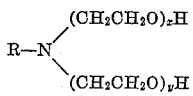

wherein R was a hydrocarbon chain of 18 carbon atoms and the sum of $x$ and $y$ was 50, was reacted with one equivalent (221 grams) of 2,4-dichlorophenoxyacetic acid following the same procedure as employed in Example I. The resulting salt was completely soluble in water and displayed good herbicidal properties.

Example IV

One equivalent (494 grams) of an amine of the general formula

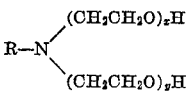

wherein R was a mixture of aliphatic groups as derived from soybean oil and $x$ plus $y$ totaled 5, was reacted with one equivalent (221 grams) of 2,4-dichlorophenoxyacetic acid following the same procedure as employed in Example I. The resulting salt was completely soluble in water and displayed good herbicidal properties.

Example V

One equivalent (934 grams) of an amine of the general formula

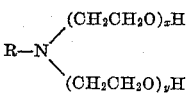

wherein R was a mixture of aliphatic groups as derived from soybean oil and $x$ plus $y$ totaled 15, was reacted with one equivalent (221 grams) of 2,4-dichlorophenoxyacetic acid following the same procedure as employed in Example I. The resulting salt was completely soluble in water and displayed good herbicidal properties.

Example VI

One equivalent (494 grams) of an amine of the general formula

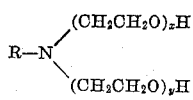

wherein R was a mixture of aliphatic groups as derived from soybean oil and $x$ plus $y$ totaled 5, was reacted with one equivalent (255.5 grams) of 2,4,5-trichlorophenoxyacetic acid following the same procedure as employed in Example I. The resulting salt was a cloudy dispersion in water and displayed good herbicidal properties.

Example VII

One equivalent (934 grams) of an amine of the general formula

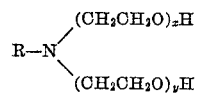

wherein R was a mixture of aliphatic groups as derived from soybean oil and $x$ plus $y$ totaled 15, was reacted with one equivalent (255.5 grams) of 2,4,5-trichlorophenoxyacetic acid following the same procedure as employed in Example I. The resulting salt was completely soluble in water and displayed good herbicidal properties.

In the following examples amine salts of plant hormones were prepared using amines obtained from Hercules Powder Company called "Polyrads" which are ethylene oxide derivatives of a technical grade of dehydroabietylamine prepared from wood rosin.

Example VIII

One equivalent (535 grams) of an amine (Polyrad 0500) of the general formula:

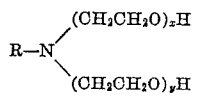

wherein R was derived from wood rosin and $x$ plus $y$ totaled 5, was reacted with one equivalent (221 grams) of 2,4-dichlorophenoxyacetic acid following the same procedure as in Example I. The resulting salt was slightly dispersible in water.

Example IX

One equivalent (799 grams) of an amine (Polyrad 1100) of the general formula:

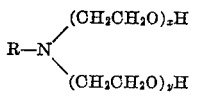

wherein R was derived from wood rosin and $x$ plus $y$ totaled 11, was reacted with one equivalent (221 grams) of 2,4-dichlorophenoxyacetic acid following the same procedure as in Example I. The resulting salt was completely soluble in water.

Example X

One equivalent (535 grams) of an amine (Polyrad 0500) of the general formula:

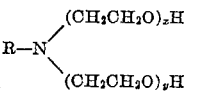

wherein R was derived from wood rosin and $x$ plus $y$ totaled 5, was reacted with one equivalent (255.5 grams) of 2,4,5-trichlorophenoxyacetic acid following the same procedure as in Example I. The resulting amine salt was slightly dispersible in water.

Example XI

One equivalent (799 grams) of a amine (Polyrad 1100) of the general formula:

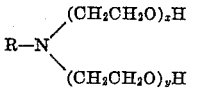

wherein R was derived from wood rosin and $x$ plus $y$ totaled 11, was reacted with one equivalent (255.5 grams) of 2,4,5-trichlorophenoxyacetic acid following the same procedure as in Example I. The resulting amine salt was completely soluble in water.

The line of demarcation wherein the transition from insoluble to soluble occurs does not lend itself to quantitative exactness. This is due to the fact that there are at least two variables, namely, the length of the aliphatic group and the length or lengths of the oxyethyl groups. In general, however, it may be said that if the number of oxyethyl groups present in the amine molecule is 3 or greater, the resulting amine salt of the plant hormone carboxylic acid will be readily dispersible or soluble in water. Conversely, if the number of oxyethyl groups present in the amine molecule is less than 3, the resulting amine salt of the plant hormone carboxylic acid will be insoluble in water.

Besides the wide range of solubility which can be achieved by this invention there are also several other desirable advantages which are realized in using these novel amine salts as herbicidal agents. One of these advantages is that amines or amine salts of the general formula

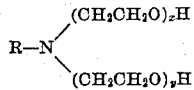

are cationic surface active agents. Because of this, water solutions of many of the amine salts of a plant hormone carboxylic acid have increased wetting or penetrating properties as compared to solutions of other water soluble salts of the plant hormone acid. This distinction, indeed, is not merely academic, for the prior art shows numerous attempts at increasing the wetting action of plant hormone acid solutions by the addition of wetting agents and the like.

Another distinct advantage of this invention is that the solubility of these novel amine salts of a plant hormone carboxylic acid are unaffected by the mineral content normally found in natural waters.

Note is made in the literature of the fact that 2,4-D in a water solution tends to precipitate in the presence of certain metal ions, for example, calcium ions. Accordingly, several of the prior workers have dealt with this problem by the addition of various organic substances to a solution of a plant hormone in order to remedy this adverse effect of inorganic ions. In the present invention, however, no such problem arises for a solution of a soluble form of one of these novel amine salts of a plant hormone carboxylic acid is not affected by the presence of minerals found in natural occurring waters.

While this invention has been described and exemplified in terms of its preferred modifications, those skilled in the art will appreciate that variations can be made without departing from the spirit and scope of the invention as defined herein.

I claim:
1. An herbicidal compound having the formula:

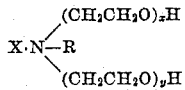

wherein X is an herbicidal plant hormone carboxylic acid, R is a radical selected from the group consisting of straight-chain aliphatic hydrocarbon radicals having from 8 to 22 carbon atoms and an abietyl radical, and $x$ and $y$ are integers, the sum of which is from 2 to 50.

2. An herbicidal compound having the formula:

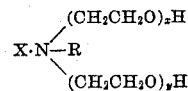

wherein X is a plant hormone carboxylic acid selected from the group consisting of 2,4-dichlorophenoxyacetic acid and 2,4,5-trichlorophenoxyacetic acid, R is a radical selected from the group consisting of straight-chain aliphatic hydrocarbon radicals having from 8 to 22 carbon atoms and an abietyl radical, and $x$ and $y$ are integers, the sum of which is from 2 to 50.

3. An herbicidal compound having the formula:

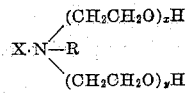

wherein X is an herbicidal plant hormone carboxylic acid, R is a straight-chain aliphatic hydrocarbon radical having from 8 to 22 carbon atoms and $x$ and $y$ are integers, the sum of which is from 2 to 50.

4. An herbicidal compound having the formula:

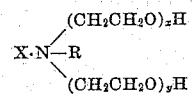

wherein X is a plant hormone carboxylic acid selected from the group consisting of 2,4-dichlorophenoxyacetic acid and 2,4,5-trichlorophenoxyacetic acid, R is a straight-chain aliphatic hydrocarbon radical having from 8 to 22 carbon atoms and $x$ and $y$ are integers, the sum of which is from 2 to 50.

5. An herbicidal compound comprising the salt of 2,4-dichlorophenoxyacetic acid and a cationic surface active agent having the formula:

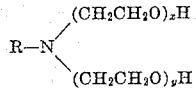

wherein R is a straight-chain aliphatic hydrocarbon radical having from 8 to 22 carbon atoms and $x$ and $y$ are integers, the sum of which is from 2 to 50.

6. An herbicidal compound according to claim 5 wherein R is a lauryl radical.

7. An herbicidal compound according to claim 5 wherein R is a stearyl radical.

8. An herbicidal compound according to claim 5 wherein R is a mixture of aliphatic hydrocarbon groups as derived from soybean oil.

9. An herbicidal compound according to claim 5 wherein R is a mixture of aliphatic hydrocarbon groups as derived from tallow.

10. An herbicidal compound according to claim 5 wherein R is a mixture of aliphatic hydrocarbon groups as derived from coconut oil.

11. An herbicidal compound comprising the salt of 2,4,5-trichlorophenoxyacetic acid and a cationic surface active agent of the formula:

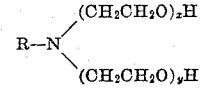

wherein R is a straight-chain aliphatic hydrocarbon radical having from 8 to 22 carbon atoms and $x$ and $y$ are integers, the sum of which is from 2 to 50.

12. An herbicidal compound according to claim 11 wherein R is a lauryl radical.

13. An herbicidal compound according to claim 11 wherein R is a stearyl radical.

14. An herbicidal compound according to claim 11 wherein R is a mixture of aliphatic hydrocarbon groups as derived from soybean oil.

15. An herbicidal compound according to claim 11 wherein R is a mixture of aliphatic hydrocarbon groups as derived from tallow.

16. An herbicidal compound according to claim 11 wherein R is a mixture of aliphatic hydrocarbon groups as derived from coconut oil.

17. An herbicidal compound according to claim 14 wherein the sum of $x$ and $y$ is 5.

18. An herbicidal compound according to claim 14 wherein the sum of $x$ and $y$ is 15.

19. An herbicidal compound according to claim 8 wherein the sum of $x$ and $y$ is 5.

20. An herbicidal compound according to claim 7 wherein the sum of $x$ and $y$ is 50.

21. An herbicidal compound according to claim 7 wherein the sum of $x$ and $y$ is 2.

22. A method for killing weeds in an active state of growth, which comprises applying to the weeds a compound having the formula:

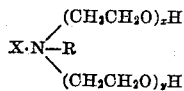

wherein X is an herbicidal plant hormone carboxylic acid, R is a radical selected from the group consisting of straight-chain aliphatic hydrocarbon radicals having from 8 to 22 carbon atoms and an abietyl radical, and $x$ and $y$ are integers, the sum of which is from 2 to 50.

References Cited in the file of this patent

UNITED STATES PATENTS

| | | |
|---|---|---|
| 2,394,916 | Jones | Feb. 12, 1946 |
| 2,590,815 | Dosser | Mar. 25, 1952 |
| 2,626,212 | Sowa | Jan. 20, 1953 |

OTHER REFERENCES

"Ethomeens, Ethomids, Ethofats," published by Armour Chemical Division, Armour and Company (1949), page 3.

Pink Paper Bulletin "Emulsifiable Concentrate Formulations for DDT-chlordane-2,4 D," received with the above in the Patent Office (February 1950), page 3.